3,193,554
CYCLOPENTANOPHENANTHRENE COMPOUNDS AND PROCESS
Alexander D. Cross, Fred A. Kincl, and Albert Bowers, Mexico City, Mexico, assignors, by mesne assignments, to Syntex Corporation, a corporation of Panama
No Drawing. Filed Feb. 21, 1962, Ser. No. 174,682
Claims priority, application Mexico, Jan. 3, 1962, 65,582
19 Claims. (Cl. 260—287)

The present invention relates to new cyclopentanophenanthrene derivatives and to a process for the preparation thereof.

More particularly, it relates to new 6-aza-androstane derivatives.

The new compounds object of the present invention are represented by the following formulas:

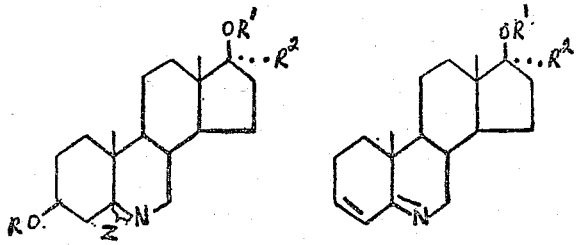

In the above formulas R and $R^1$ represent hydrogen or a hydrocarbon carboxylic acyl group of less than 12 carbon atoms; $R^2$ represents hydrogen or a lower alkyl group; and Z may be a double bond or a single bond between C-5 and N-6. The acyl group is derived from hydrocarbon carboxylic acids of less than 12 carbon atoms, which may be saturated or unsaturated, of straight, branched, cyclic or mixed aliphatic-cyclic chain, or aromatic, and may be substituted with functional groups such as hydroxyl, alkoxy of up to 5 carbon atoms, acyloxy of up to 12 carbon atoms, nitro, amino or halogen. Typical such esters are the acetate, propionate, enanthate, benzoate, trimethylacetate, t-butylacetate, phenoxyacetate, cyclopentylpropionate and β-chloropropionate.

The compounds represented by the above formulas are hormones of the androgenic type which exhibit a separation between their androgenic and anabolic activities, stimulate the action of the pituitary gland and show anti-estrogenic and anti-progestational activity, and also inhibit luteinization.

The novel compounds object of the present invention are prepared by the method illustrated as follows:

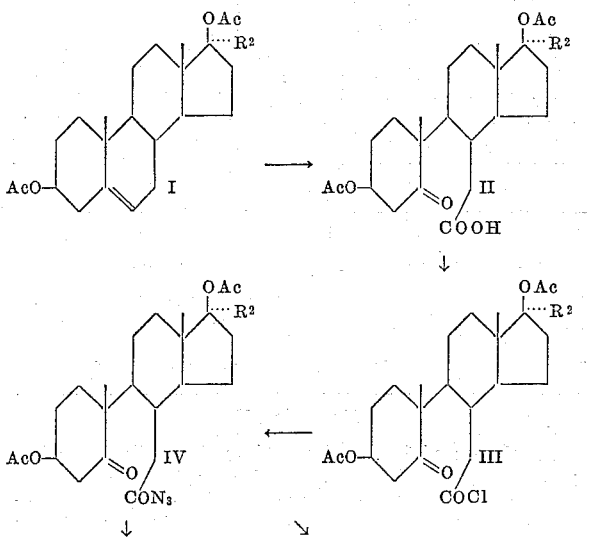

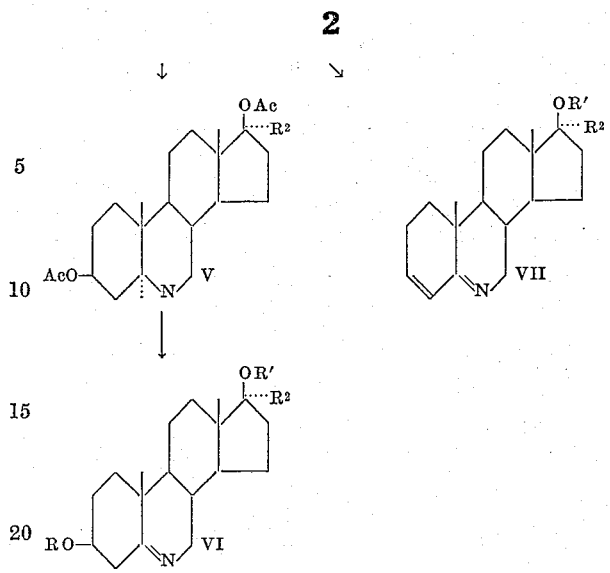

In the abve formulas R, $R^1$ and $R^2$ have the same meaning set forth previously. Ac represents the acyl group, preferably the acetyl group.

In effecting the process set forth above, the starting compound (I), which is a diacylate, preferably the diacetate, of $\Delta^5$-androstene-3β,17β-diol or of a 17α-lower alkyl derivative, is treated with ozone and the resulting compound is treated with hydrogen peroxide, thus giving rise to 3β,17β-diacetoxy-5,6-seco-androstane-5-one-6-carboxylic acid (II), or the 17α-lower alkyl derivative. These compounds, upon treatment with a chlorinating agent, preferably with thionyl chloride, produce the respective acid chlorides (III), which on further reaction with the azide of an alkali metal, preferably with sodium azide, afford the azides of the corresponding acids (IV). By treatment of the later compounds with acid at steam bath temperature, followed by conventional isolation of the product, there are obtained the respective 17β-acetoxy-6-aza-$\Delta^{3,5}$-androstadienes (VII: $R^1$=Ac), which on conventional saponification in alkaline medium produce the corresponding free 17β-alcohols (VII: $R^1$=H).

By following a second sequence of reactions, the azides mentioned above (IV), are reacted with an amide, preferably with dimethylformamide, thus producing the corresponding 3β,17β-diacetoxy-5,7-seco-6-nor-androstan-7-isocyanates, which on hydrogenation in the presence of an adequate catalyst, such as platinum oxide, produce the respective 3β,17β-diacetoxy-6-aza-androstanes (V). These compounds on reaction with hypochlorous acid followed by treatment of the resulting N-chloro compounds with a base, such as for example methanolic sodium hydroxide, at the reflux temperature, afford the corresponding 6-aza-$\Delta^5$-androstane-3β,17β-diols (VI: R=$R^1$=H).

The compounds obtained as set forth above, having a secondary hydroxyl group in the molecule, for example in the C-3β position (VI: R=H) or at the C-17β position (VII: $R^1$=$R^2$=H) when the C-17α position is occupied by hydrogen, are acylated conventionally by reaction in pyridine with an acylating agent, such as the anhydride of a hydrocarbon carboxylic acid of the type set forth previously, to produce the corresponding 3β or 17β-acylates (VI: R=acyl; VII: $R^1$=acyl, $R^2$=H).

The compounds having a tertiary hydroxyl group in the molecule (VI, VII: $R^1$=H, $R^2$=alkyl) are conventionally esterified in the presence of p-toluenesulfonic acid with an acylating agent such as for example an anhydride of the type set forth above, to produce in this manner the respective 17β-acylates (VI, VII: $R^1$=acyl, $R^2$=alkyl).

The processes described above may be applied to the corresponding 2α-methyl derivatives of the starting com pounds, thus forming the intermediate derivatives and the final products having a methyl group at the 2α position.

The following specific examples serve to illustrate but are not intended to limit the scope of the invention.

*Example I*

A solution of 5.2 g. of the diacetate of Δ⁵-androstene-3β,17β-diol in 50 cc. of glacial acetic acid and 50 cc. of ethyl acetate was placed in an ozonization tube and cooled in an ice-salt bath. A stream of ozone was introduced for 2 hours (0.024 mol per hour), then 20 cc. of water and 3 cc. of 30% hydrogen peroxide were added and the mixture was stirred vigorously. The mixture was heated for half an hour on the steam bath and then kept at room temperature for 48 hours. The resulting solution was concentrated to a small volume under vacuum and at the steam bath temperature, diluted with 20 cc. of methanol and poured into water. The mixture was extracted with ether and the extract was washed with water, dried over anhydrous sodium sulfate and evaporated to dryness. Crystallization of the residue from ether-pentane afforded 3β,17β-diacetoxy-5,6-seco-androstan-5-one-6-carboxylic acid.

*Example II*

A mixture of 5 g. of the above acid, 50 cc. of absolute ether, 5 cc. of dimethylformamide and 2.5 cc. of thionyl chloride was kept for 1 hour at room temperature and then poured into ice-water. The ether layer was separated, dried over anhydrous sodium sulfate and evaporated to dryness, thus yielding the chloride of 3β,17β-diacetoxy-5,6-seco-androstan-5-one-6-carboxylic acid.

*Example III*

To 4 g. of the above chloride in 80 cc. of acetone was added 1.2 g. of sodium azide in 12 cc. of water and the mixture was kept standing for 10 minutes and then poured into water and extracted with ether. The ether extract was washed with water, dried over sodium sulfate and evaporated to dryness, thus giving the azide of 3β,17β-diacetoxy-5,6-seco-androstan-5-one-6-carboxylic acid.

*Example IV*

The above product was dissolved in 15 cc. of acetic acid and treated with 2 cc. of water. The solution was heated on the steam bath until the evolution of nitrogen ceased, cooled, alkalinized with sodium hydroxide and extracted with ether. The ether extract was stirred with 0.5 N hydrochloric acid solution and the acid layer was separated and alkalinized. It was then heated in order to remove the ether which had dissolved and the precipitate formed was collected by filtration, dried and recrystallized from acetone, thus furnishing 17β-acetoxy-6-aza-Δ³,⁵-androstadiene.

*Example V*

A mixture of 4 g. of the azide obtained in accordance with Example III and 10 cc. of dimethylformamide was heated on the steam bath until the evolution of nitrogen ceased (approximately 5 minutes). 2 cc. of water was added and the mixture was cooled, thus producing a crystalline precipitate of 3β,17β-diacetoxy-5,7-seco-6-nor-androstan-7-isocyanate.

*Example VI*

A solution of 2 g. of the above compound in 100 cc. of acetic acid was stirred with 200 mg. of platinum oxide under an atmosphere of hydrogen until the uptake of 1 molar equivalent of hydrogen. The catalyst was removed by filtration and the filtrate was evaporated to dryness under reduced pressure. Crystallization of the residue from acetonitrile afforded 3β,17β-diacetoxy-6-aza-androstane.

*Example VII*

To 2 g. of the above compound in 50 cc. of absolute ether was added 5 cc. of a 1 M ether solution of hypo-chlorous acid. The resulting mixture was kept standing for 5 minutes and then treated with 5 cc. of a cold 0.5 N solution of sulfuric acid. The mixture was washed with 0.5 N sodium hydroxide solution and the ether layer was separated, dried and evaporated to dryness, thus leaving as a residue the N-chloro-derivative of the starting compound. This derivative was boiled under reflux with 40 cc. of 5% methanolic sodium hydroxide solution for 1 hour, then cooled and diluted with water. The precipitate formed was collected, dried and recrystallized from acetone, thus affording 6-aza-Δ⁵-androstene-3β,17β-diol.

*Example VIII*

17α-methyl-Δ⁵-androstene-3β,17β-diol was acetylated conventionally with acetic anhydride in the presence of p-toluenesulfonic acid, to form the diacetate of the starting compound, which was treated in accordance wth the preceding examples, to produce successively: 3β,17β-diacetoxy-17α-methyl-5,6-seco-androstan-5-one-6-carboxylic acid, the chloride of 3β,17β-diacetoxy-17α-methyl-5,6-seco-androstan-5-one-6-carboxylic acid, the azide of 3β,17β-diacetoxy - 17α - methyl-5,6-seco-androstan-5-one-6-carboxylic acid, 17β-acetoxy-17α-methyl-6-aza-Δ³,⁵-androstadiene, 3β,17β-diacetoxy - 17α - methyl-5,7-seco-6-nor-androstan - 7 - isocyanate, 3β,17β-diacetoxy-17α-methyl-6-aza-androstane, and finally 17α-methyl-6-aza-Δ⁵-androstene-3β,17β-diol.

*Example IX*

Androstenolone was treated with ethyl magnesium bromide to give 17α-ethyl-Δ⁵-androsten-3β,17β-diol, which was conventionally acetaylated with acetic anhydride in the presence of p-toluenesulfonic acid, to form the corresponding diacetate, which was then treated in accordance with Examples I, II, III, IV, V, VI and VII, thus producing successively: 3β,17β-diacetoxy-17α-ethyl - 5,6 - seco-androstan-5-one-6-carboxylic acid, the chloride of 3β,17β-diacetoxy-17α-ethyl-5,6-seco-androstan-5-one-6-carboxylic acid, the azide of 3β,17β-diacetoxy-17α-ethyl-5,6-seco-androstan-5-one-6-carboxylic acid, 17β-acetoxy-17α-ethyl-6-aza-Δ³,⁵-androstadiene, 3β,17β-diacetoxy-17α-ethyl-5,7-seco-6-nor-androstan-7-isocyanate, 3β,17β-diacetoxy - 17α-ethyl-6-aza-androstane and 17α-ethyl-6-aza-Δ⁵-androstene-3β,17β-diol.

*Example X*

A solution of 0.17 g. of potassium hydroxide in 2 cc. of water and 2.5 cc. of methanol was added over a period of 30 minutes to a boiling solution of 1 g. of 17β-acetoxy-6-aza-Δ³,⁵-androstadiene in 30 cc. of methanol, under an atmosphere of nitrogen. The boiling was continued for 2 hours further and then the solution was cooled, neutralized with acetic acid and concentrated under reduced pressure.

By dilution with water, followed by crystallization of the precipitate from acetone-hexane, there was obtained 6-aza-Δ³,⁵-androstadien-17β-ol.

By following the same proces, the compounds listed under I were treated to produce the products under II.

| I | II |
|---|---|
| 17β-acetoxy-17α-methyl-6-aza-Δ³,⁵-androstadiene. | 17α-methyl-6-aza-Δ³,⁵-androstadien-17β-ol. |
| 17β-acetoxy-17α-ethyl-6-aza-Δ³,⁵-androstadiene. | 17α-ethyl-6-aza-Δ³,⁵-androstadien-17β-ol. |
| 3β,17β-diacetoxy-17α-methyl-6-aza-androstane. | 17α-methyl-6-aza-androstane-3β,17β-diol. |
| 3β,17β-diacetoxy-17α-ethyl-6-aza-androstane. | 17α-ethyl-6-aza-androstane-3β,17β-diol. |
| 3β,17β-diacetoxy-6-aza-androstane. | 6-aza-androstane-3β,17β-diol. |

*Example XI*

A mixture of 1 g. of 6-aza-Δ³,⁵-androstadien-17β-ol, 4 cc. of pyridine and 2 cc. of propionic anhydride was kept overnight at room temperature, then poured into ice water and the precipitate formed was collected, washed with water and dried. By crystallization from acetone-hexane there was obtained the 17-propionate of 6-aza-Δ³,⁵-androstadien-17β-ol.

When treating the compounds listed below under I by the above process, there were obtained the products under II.

| I | II |
|---|---|
| 6-aza-Δ⁵-androstene-3β,17β-diol | The dipropionate of 6-aza-Δ⁵-androstene-3β,17β-diol. |
| 17α-methyl-6-aza-Δ⁵-androstene-3β,17β-diol. | The 3-propionate of 17α-methyl-6-aza-Δ⁵-androstene-3β,17β-diol. |
| 17α-ethyl-6-aza-Δ⁵-androstene-3β,17β-diol. | The 3-propionate of 17α-ethyl-6-aza-Δ⁵-androstene-3β,17β-diol. |

*Example XII*

A solution of 5 g. of 17α-methyl-6-aza-Δ³,⁵-androstadien-17β-ol in 100 cc. of anhydrous benzene was treated with 1 g. of p-toluenesulfonic acid and 10 cc. of caproic anhydride and the mixture was kept at room temperature for 24 hours and then poured into ice water; the resulting mixture was stirred in order to hydrolyze the excess of anhydride. The benzene layer was separated, washed with 10% sodium carbonate solution and water, dried and evaporated. Crystallization of the residue from ether-hexane afforded the 17-caproate of 17α-methyl-6-aza-Δ³,⁵-androstadien-17β-ol.

In the same manner there were treated 17α-ethyl-6-aza-Δ³,⁵-androstadien-17β-ol, 17α-methyl-6-aza-Δ⁵-androstene-3β,17β-diol 3-propionate and 17α-ethyl-6-aza-Δ⁵-androstene-3β,17β-diol 3-propionate, to produce respectively: 17α-ethyl-6-aza-Δ³,⁵-androstadien-17β-ol 17-caproate, 17α-methyl-6-aza-Δ⁵-androstene-3β,17β-diol 3-propionate-17-caproate and 17α-ethyl-6-aza-Δ⁵-androstene-3β,17β-diol 3-propionate-17-caproate.

We claim:
1. A compound of the following formula:

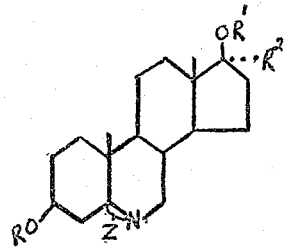

wherein R and R¹ are each selected from the group consisting of hydrogen and hydrocarbon carboxylic acyl of less than 12 carbon atoms; R² is selected from the group consisting of hydrogen and lower alkyl and Z is selected from the group of a double bond and a saturated linkage between C-5 and N-6.

2. 6-aza-Δ⁵-androstene-3β,17β-diol.
3. 17α-methyl-6-aza-Δ⁵-androstene-3β,17β-diol.
4. 17α-ethyl-6-aza-Δ⁵-androstene-3β,17β-diol.
5. The dipropionate of 6-aza-Δ⁵-androstene-3β,17β-diol.
6. The dipropionate of 17α-methyl-6-aza-Δ⁵-androstene-3β,17β-diol.
7. The dipropionate of 17α-ethyl-6-aza-Δ⁵-androstene-3β,17β-diol.
8. A hydrocarbon carboxylic acid ester of less than 12 carbon atoms of 6-aza-Δ⁵-androstene-3β,17β-diol.
9. A hydrocarbon carboxylic acid ester of less than 12 carbon atoms of 17α-methyl-6-aza-Δ⁵-androstene-3β,17β-diol.
10. A hydrocarbon carboxylic acid ester of less than 12 carbon atoms of 17α-ethyl-6-aza-Δ⁵-androstene-3β,17β-diol.
11. The compound of the following formula:

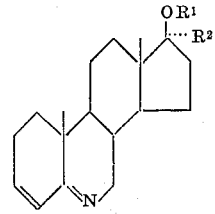

wherein R¹ is selected from the group consisting of hydrogen and hydrocarbon carboxylic acyl of less than 12 carbon atoms; and R² is selected from the group consisting of hydrogen and lower alkyl.

12. 6-aza-Δ³,⁵-androstadien-17β-ol.
13. 17α-methyl-6-aza-Δ³,⁵-androstadien-17β-ol.
14. 17α-ethyl-6-aza-Δ³,⁵-androstadien-17β-ol.
15. 6-aza-Δ³,⁵-androstadien-17β-ol-propionate.
16. 17α-methyl-6-aza-Δ³,⁵-androstadien-17β-ol-caproate.
17. 17α-ethyl-6-aza-Δ³,⁵-androstadien-17β-ol-caproate.
18. A process for preparing 6-aza-Δ³,⁵-androstadien-17β-ol, which comprises treating the diacetate of Δ⁵-androstene-3β,17β-diol with ozone, followed by hydrogen peroxide, reacting the resulting 3β,17β-diacetoxy-5,6-seco-androstan-5-one-6-carboxylic acid with thionyl chloride, treating the acid chloride thus obtained with sodium azide, reacting the resulting azide of 3β,17β-diacetoxy-5,6-seco-androstan-5-one-6-carboxylic acid with acetic acid at the temperature of the steam bath to produce 17β-acetoxy-6-aza-Δ³,⁵-androstadiene and conventionally saponifying this compound to produce 6-aza-Δ³,⁵-androstadien-17β-ol.
19. A process for preparing 17α-lower alkyl-6-aza-Δ³,⁵-androstadien-17β-ol, which comprises treating the diacetate of 17α-lower alkyl-Δ⁵-androstene-3β,17β-diol with ozone, followed by hydrogen peroxide, reacting the resulting 17α-lower alkyl-3β,17β-diacetoxy-5,6-seco-androstan-5-one-6-carboxylic acid with thionyl chloride, treating the acid chloride thus obtained with sodium azide, reacting the resulting azide of 17α-lower alkyl-3β,17β-diacetoxy-5,6-seco-androstan-5-one-6-carboxylic acid with acetic acid at the temperature of the steam bath to produce 17α-lower alkyl-17β-acetoxy-6-aza-Δ³,⁵-androstadiene and conventionally saponifying this compound to produce 17α-lower alkyl-6-aza-Δ³,⁵-androstadien-17β-ol.

References Cited by the Examiner

UNITED STATES PATENTS 3,022,312  2/62  Wildi _____ 260—389
3,023,227  2/62  Atwater _____ 260—345.3

FOREIGN PATENTS 1,118,197  11/61  Germany.

OTHER REFERENCES

Joska et al.: Chem. Abs., vol. 53, cols. 5341–2 (1959).
Lettre et al.: Ber. dent. Chem., vol. 93, pp. 2860–4 (1960).

NICHOLAS S. RIZZO, *Primary Examiner.*

DUVAL T. McCUTCHEN, WALTER A. MODANCE,
*Examiners.*